UNITED STATES PATENT OFFICE.

EDMUND J. SMITH, OF WESTPORT, NEW YORK, ASSIGNOR OF ONE-HALF TO GEORGE W. PATTISON, OF SAME PLACE.

VETERINARY REMEDY.

SPECIFICATION forming part of Letters Patent No. 246,426, dated August 30, 1881.

Application filed March 26, 1881. (No specimens.)

*To all whom it may concern:*

Be it known that I, EDMUND J. SMITH, a citizen of the United States, residing at Westport, in the county of Essex and State of New York, have invented a new and useful composition of matter to be used for the cure of wounds, bruises, sores of horses, cattle, sheep, scratches and all foot-cracks of horses, foot-rot of sheep, and all affections of animals of the kind and character above mentioned or connected therewith, of which the following is a specification.

My composition consists of the following ingredients, combined in the proportion stated, viz: blue vitriol, one pound; boiling water, one quart; verdigris, one-fourth pound; gunpowder, two ounces; soft soap, three gills; spirits turpentine, three gills. In preparing the same for use the vitriol is pulverized and upon it is poured the boiling water, which extracts its strength. While hot all the other ingredients are put in and thoroughly mingled by agitation. It is then ready for bottling and use.

In using the above-named composition the bottle should be first thoroughly shaken and the mixture applied to the wound with a sponge or swab, no previous washing or bathing of the part affected being necessary. It prevents the formation of proud flesh in the wound or sore, is very penetrating, and causes rapid healing. In the case of foot-rot in sheep it is particularly beneficial, making sound feet.

I am aware that the elements of my special combination have been used in various mixtures; but I am not aware that all of the ingredients of my composition in the proportions stated have been used together.

What I claim, and desire to secure by Letters Patent of the United States, is—

The herein-described composition of matter, to be used for the curing of wounds, bruises, sores, and injuries of horses and all other animals, as above named, consisting of blue vitriol, boiling water, verdigris, gunpowder, soft soap, and spirits turpentine, in the proportions specified.

EDMUND J. SMITH.

Witnesses:
CHARLES A. PATTISON,
WILLIAM DOUGLASS.